US012176607B2

(12) United States Patent
Xie et al.

(10) Patent No.: US 12,176,607 B2
(45) Date of Patent: Dec. 24, 2024

(54) BASE STATION

(71) Applicant: Telefonaktiebolaget LM Ericsson (publ), Stockholm (SE)

(72) Inventors: Tao Xie, Beijing (CN); Jianjun An, Beijing (CN); Jialin Li, Beijing (CN); Ningmin Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 99 days.

(21) Appl. No.: 18/022,547

(22) PCT Filed: Sep. 29, 2020

(86) PCT No.: PCT/CN2020/118777
§ 371 (c)(1),
(2) Date: Feb. 22, 2023

(87) PCT Pub. No.: WO2022/067486
PCT Pub. Date: Apr. 7, 2022

(65) Prior Publication Data

US 2023/0327331 A1 Oct. 12, 2023

(51) Int. Cl.
*H01Q 1/42* (2006.01)
*H01Q 1/24* (2006.01)
*H01Q 21/24* (2006.01)

(52) U.S. Cl.
CPC ............... *H01Q 1/42* (2013.01); *H01Q 1/246* (2013.01); *H01Q 21/24* (2013.01)

(58) Field of Classification Search
CPC .......... H01Q 1/42; H01Q 1/246; H01Q 21/24; H01Q 1/405
See application file for complete search history.

(56) References Cited

U.S. PATENT DOCUMENTS

| | | | | |
|---|---|---|---|---|
| 11,223,113 | B2 * | 1/2022 | Hicks | H01Q 1/005 |
| 11,728,565 | B2 * | 8/2023 | Su | H01Q 21/08<br>343/702 |
| 11,855,335 | B2 * | 12/2023 | Hou | H01Q 1/02 |
| 2018/0192508 | A1 | 7/2018 | Sun | |
| 2019/0268046 | A1 | 8/2019 | Kim et al. | |
| 2019/0334232 | A1 | 10/2019 | Ha et al. | |

FOREIGN PATENT DOCUMENTS

| | | | |
|---|---|---|---|
| CN | 206546874 | U | 10/2017 |
| CN | 110890630 | A | 3/2020 |
| CN | 111063998 | A | 4/2020 |
| CN | 210692755 | U | 6/2020 |
| WO | 2018205277 | A1 | 11/2018 |
| WO | 2019170112 | A1 | 9/2019 |

* cited by examiner

*Primary Examiner* — Seung H Lee
(74) *Attorney, Agent, or Firm* — Murphy, Bilak & Homiller, PLLC

(57) ABSTRACT

The present disclosure provides a base station. The base station includes a multi-function board, a radome and at least one antenna element. The radome is configured to cover the multi-function board. The at least one antenna element is provided between the multi-function board and the radome. The multi-function board is configured to integrate with at least two of functions of a radio board, an EMC cover, an AC board, an antenna reflector, and an Antenna board.

15 Claims, 3 Drawing Sheets

BASE STATION

TECHNICAL FIELD

The present disclosure generally relates to a technical field of communication industry, more particular to a base station used therein.

BACKGROUND

Typically, in an existing building practice, an antenna unit assembly, a radome and a radio board are separate from each other. The radome is usually fixed to a heatsink by screws.

A tower for installing them is already overcrowded. With development of 5G technology, mobile broadband operators always desire reducing installation space. As discussed above, because of being separate from each other and a lot of gaps between them, the radome, the radio board and the antenna unit assembly occupy a relative large size or height, so it becomes a key point to be improved.

SUMMARY

In view of the foregoing, an object of the present disclosure is to overcome or at least mitigate at least one of above shortcomings in the prior art solution. Herein, the present disclosure provides a new type of the base station.

In accordance with one aspect of the present application, it provides a base station, comprising:

a multi-function board;

a radome, configured to cover the multi-function board; and at least one antenna element, provided between the multi-function board and the radome, wherein the multi-function board is configured to integrate with at least two of functions of a radio board, an EMC cover, an AC board, an antenna reflector, and an antenna board.

In some embodiments, the multi-function board comprises first and second sub multi-function boards and an antenna board stacked on each other.

In some embodiments, the first sub multi-function board is configured to integrate with functions of the radio board and the AC board.

In some embodiments, the second sub multi-function board is configured to integrate with functions of the EMC cover and the antenna reflector.

In some embodiments, the at least one antenna element is provided on the antenna board.

In some embodiments, a mounting boss is provided on the second sub multi-function board and extends between the radome and the second sub multi-function board.

In some embodiments, the at least one antenna element comprises at least one primary radiator provided on the multi-function board and at least one secondary radiator provided on a surface of the radome facing the multi-function board.

In some embodiments, a gap is provided between a pair of the primary radiator and the secondary radiator corresponding to each other.

In some embodiments, the at least one secondary radiator is etched onto or plated on the surface of the radome.

In some embodiments, the at least one antenna element is provided on the multi-function board and comprises at least one primary radiator provided on the multi-function board, at least one secondary radiator provided above the corresponding primary radiator.

In some embodiments, a support member for supporting the secondary radiator is provided between a pair of the primary radiator and the secondary radiator corresponding to each other.

In some embodiments, at least one of the at least one primary radiator and the at least one secondary radiator is in a round, square, triangle or pentagon shape and respectively made by metal or a printed conducting ink.

In some embodiments, the at least one antenna element is arranged in a form of an array.

In some embodiments, the base station further comprises a heatsink configured to support the multi-function board and fix with the radome by a buckle joint, an adhesive agent or a screw.

In some embodiments, a portion of the heatsink is provided with a recess or protrusion to fix with the radome, wherein the adhesive agent is located within the recess or onto the protrusion.

In some embodiments, the radome is a flat plate.

In some embodiments, the radome is made of polycarbonate or a lamination sheet.

BRIEF DESCRIPTION OF THE DRAWINGS

These aspects and/or other aspects as well as advantages of the present application will become obvious and readily understood from the description of the preferred embodiments of the present application in conjunction with the accompanying drawings below, in which.

DETAILED DESCRIPTION OF EMBODIMENTS

In the discussion that follows, specific details of particular embodiments of the present techniques are set forth for purposes of explanation and not limitation. It will be appreciated by those skilled in the art that other embodiments may be employed apart from these specific details.

Furthermore, in some instances detailed descriptions of well-known methods, structures, and devices are omitted so as not to obscure the description with unnecessary detail.

Figure 1:
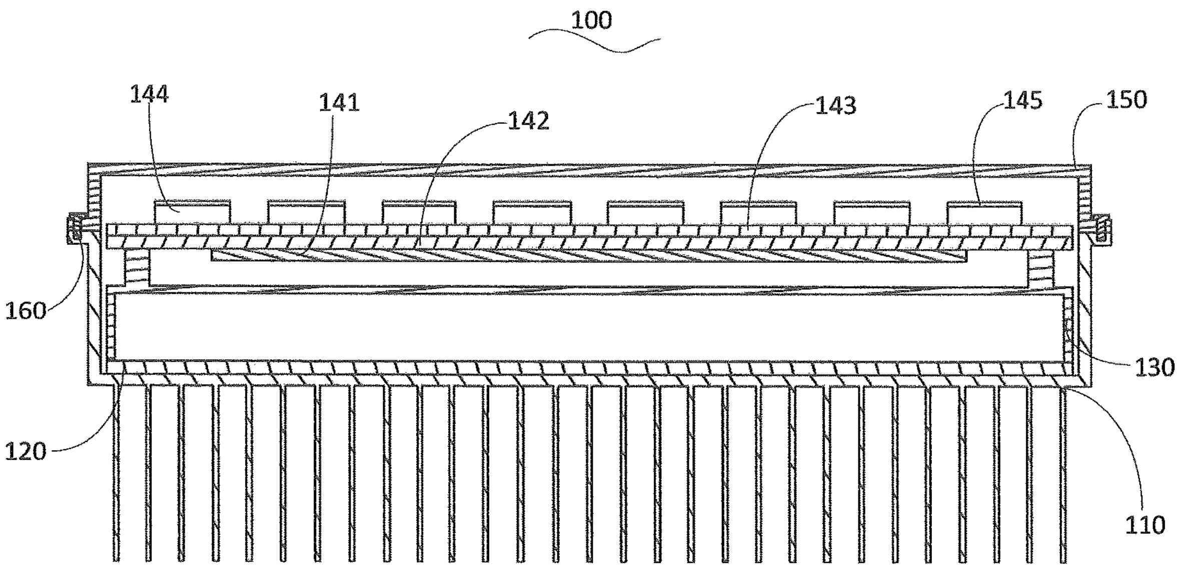
FIG. 1 is a schematic cross-sectional view of a base station in accordance with an embodiment of the present invention.

As shown in FIG. 1, it shows a typical structure of a base station 100 in accordance with the present invention. The base station 100 mainly includes a heatsink 110, a radio board 120, an EMC cover 130, an antenna unit assembly, and a radome 150 arranged in sequence from bottom to top.

The radio board 120 can be provided with a lot of radio components on one side thereof. The radome 150 is fixed with the heatsink 110 by screws 160.

The antenna unit assembly specifically includes an AC board 141, an antenna reflector 142, an antenna board 143, a back plate 144, and a radiator 145 arranged in sequence from bottom to top. The radiator 145 can be a plurality of separate radiators.

Typically, elements for constituting the antenna unit assembly and a radome used in a base station are separate from each other. The radome is only used to protect these elements, for example covering or enclosing them. Since it is desirable that the radome would not introduce any interference to radiation of the radiators, the radome is required to be relatively high, i.e., there is a large space between the radome and the antenna elements. Sometimes, for purpose of heat dissipation or radiation emission or the like, there is also a space between the AC board 141 and the EMC cover 130. For the presence of these spaces, it results in the base station to be high or thick.

Further, in a lot of base stations (for example radio base stations), radio components and antenna elements are installed within one common housing. Especially, it can be seen from 5G network rollout that most of massive MIMO product (AAS, advanced antenna system) has the antenna elements and the radio components mounted together.

In typical designs, one side of a radio (PCB) board has to be used for antenna radiation. There are a lot of gaps between the radio board 120 and the EMC cover 130, between the antenna elements, between the radome 150 and the antenna board 143, which are filled with air. The presence of the air is not beneficial to heat dissipation. Even the radio board 120 is of very high heat conductivity; it is still very difficult to efficiently dissipate heat from the side where the antenna elements are located.

Further, there are filter units integrated into the AC board 141 or installed between the AC board 141 and the EMC cover 130. Hereafter, the filter units might not be discussed, but the person skilled in the art can know how to arrange them into the base station 100.

The radome 150 is formed by injecting plastics and then is fixed with the heatsink 110 made of Aluminum by the screws 160. The present disclosure does not make any limitation on the forming of the radome 150. In this way, there is a large difference between coefficients of thermal expansion of the radome 150 and the heatsink 110, and thus a large deformation would be created when the base station 100 is subjected to a high temperature.

As discussed above, because of so many separate components, the structure of the base station 100 is very high and it is not beneficial for reducing the size of 5G AAS (Active Antenna System) antenna. Further, it is desirable to improve the heat dissipation and reduce the thermal deformation.

Some embodiments of the present invention are provided herein to solve or alleviate at least a part of this problem. It should be understood that some embodiments can be combined with each other without any conflicts on principle and structures. The following base stations can be widely applied to many kinds of products, especially for 5G AAS products.

Figure 2:
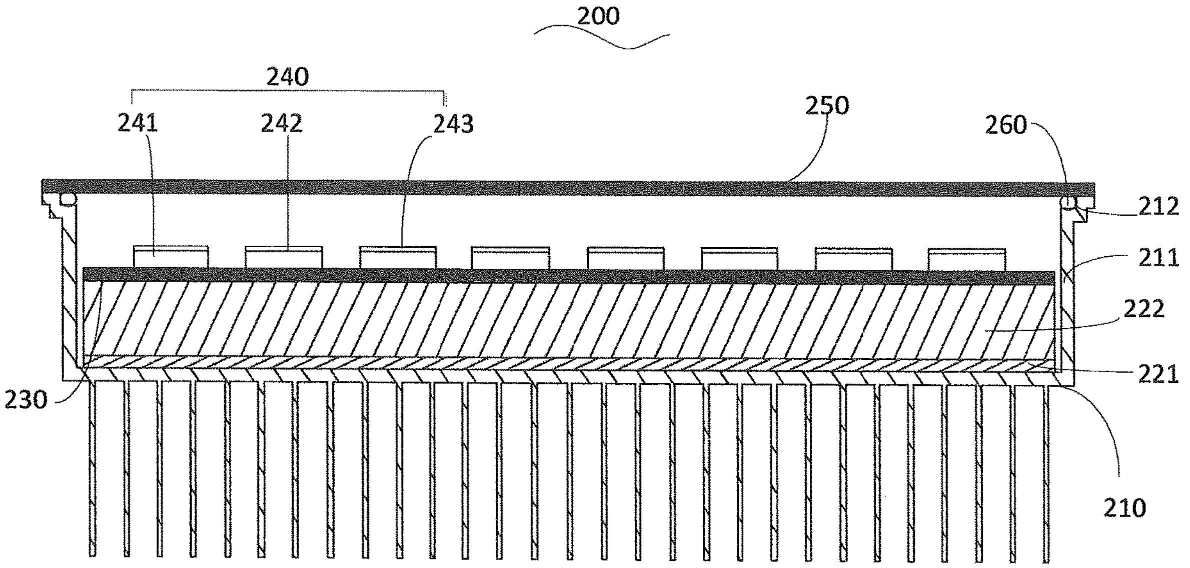
FIG. 2 is a schematic cross-sectional view of a variant of a base station in accordance with a first embodiment of the present invention.

With reference to FIG. 2, it shows a new structure arrangement of a base station 200 in accordance with an embodiment of the present invention. It is a modified embodiment based on the base station shown in FIG. 1.

The base station 200 includes a heatsink 210, a first sub multi-function board 221, a second sub multi-function board 222, an antenna board 230, at least one antenna element 240 and a radome 250 arranged in sequence from bottom to top. The first sub multi-function board 221 is formed by integrating the radio board 120 with the AC board 141 as shown in FIG. 1. That is, the first sub multi-function board 221 has the functions of the radio board 120 and the AC board 141 as provided in FIG. 1. In this point, in order to achieve the integration, a MCAC (Mutual Coupling Antenna Calibration) technology is used to replace a traditional AC solution, and thus the AC board 141 can be integrated into the radio board 120. Therefore, the AC board 141 is removed from the current base station 200.

In addition, a CWG (Ceramic Waveguide) filter is used so that the AC board 141 can be integrated into the radio board 120.

Further, the second sub multi-function board 222 is made by integrating the EMC cover 130 with the antenna reflector 142 as shown in FIG. 1. That is, the second sub multi-function board 222 has the functions of the EMC cover 130 and the antenna reflector 142 as provided in FIG. 1. A base of the EMC cover 130 can be used to function as the antenna reflector 142.

Please be noted that although the first sub multi-function board 221 and the second sub multi-function board 222 are seen to be separate, they can also be one integrated board in an alternative example. In this condition, they can be considered as a single multi-function board.

After such simplification on structures, in this situation, it is considered that the antenna element 240 includes a plurality of primary radiators 241, a plurality of support members 242 and a plurality of radiators 243 located on the support members 242 in one-to-one correspondence, which are arranged in sequence from bottom to top. Specifically, the antenna board 230 is in a form of a plate, and the primary radiators 241 are directly attached onto it. Of course, some functions of the antenna element 240 are supported by other components of the base stations 200 and such division of the components is not done in an absolute sense.

In the present example, the primary radiators 241 and the secondary radiators 243 are respectively arranged in a form of an array. It should be noted that the primary radiators 241 and the secondary radiators 242 can also be arranged in any other pattern.

Both of them can be in a round, square, a pentagon shape or any suitable shape. The secondary radiators 243 can be made of any metal or PCB based or printed conducting ink or other conductive materials. The primary radiators 241 can be made of the same materials as that of the secondary radiators 243 or a different material from that of the secondary radiators 243. Alternatively, it is optimal to select some materials having a high thermal conductivity and transparent to the electromagnetic wave for making the primary radiators 241 and the secondary radiators 243. The size and shape of them are typically determined by the RF performance, such as S-parameter and radiation patterns.

In FIG. 2, the support member 242 is shown between the primary radiator 241 and the secondary radiator 242. But this is not necessary, and it is an alternate to provide the support member 242 as a support member as long as it can enable a gap between the primary radiator 241 and the secondary radiator 242.

The heatsink 210 is formed with at least a protruding wall 211 extending upwardly, thereby forming a volume. This volume encloses the first sub multi-function board 221, the second sub multi-function board 222 and the antenna element 240. The radome 250 is a flat plate, covering the opening of the volume. Because it is desired that the base station 200 is very compact, so the radome 250 can be in a form of a plastic sheet or a lamination sheet. As compared with the arrangement shown in FIG. 1, a size or weight of the current base station 200 can be reduced.

In the present embodiment, the radome 250 can be formed by an extrusion process, without needing a mold. Therefore, the manufacturing process of the radome 250 is simplified.

In order to fix the radome 250 and the heatsink 210, the wall 211 is provided with a recess 212. The recess 212 is inserted by glue 260 so as to fix them. It should be noted that FIG. 2 only shows the recess 212 with one step, but it can have two or more steps. The number of the recess 212 can be set according to actual requirements.

Herein, the recess 212 is called as at least one stepped recess. Please be noted that the at least one stepped recess means the recess having one or more steps. In other words, the recess 212 can be an entire one along the whole extending length of the wall 211, and alternatively it can also be a plurality of ones along the whole extending length of the wall 211.

In other examples, the radome 250 can be provided with a protrusion (not shown) which is used to match with the recess 212. The present disclosure does not limit the forms of the recess, the protrusion or the fixing means as long as there is a good sealing performance between the radome 250 and the heatsink 210.

In this example, the glue is taken as one example to explain how to fix them, and it is understood that other fixing means can also be used similarly.

Figure 3:
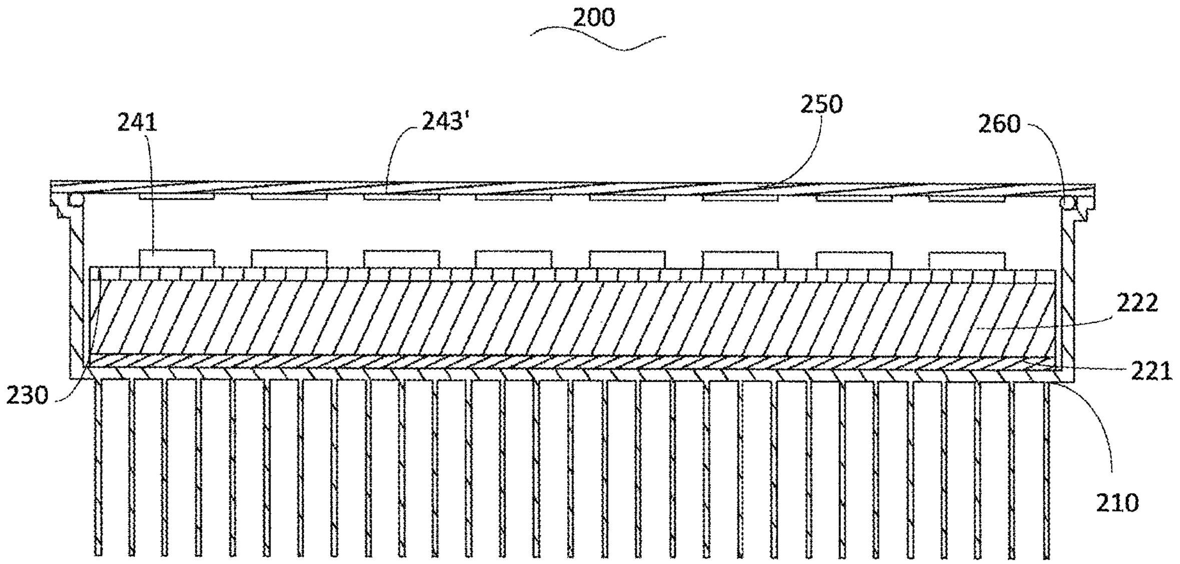
FIG. 3 is a schematic cross-sectional view of a variant of a base station in accordance with a second embodiment of the present invention.

As shown in FIG. 3, it shows an arrangement of another base station in accordance with an embodiment of the present invention. As compared with the base station as shown in FIG. 2, it only has a difference in a position of the secondary radiators.

For example, the radome 250 is formed by a lamination sheet. Due to very good strength and stiffness as well as very good flatness of the lamination sheet, the secondary radiators 243' can be easily integrated with the radome 250. In this situation, the secondary radiators 243' can be etched onto a bottom surface of the radome 250. Alternatively, the secondary radiators 243' can be plated on the bottom surface.

The secondary radiators 243' are provided on the bottom surface of the radome 250 so that it is beneficial to reduce the height of the antenna elements 240 and to dissipate heat effectively. Further, this can improve the emission of the radiators 243' through the radome 250.

In the present invention, the radome can be made by the traditional materials such as PC (polycarbonate), reinforced fiber glass or the like, and can also be formed by some lamination sheet materials. Therefore, it provides flexibility on the materials for the radome 250. The lamination sheet is an epoxy glass cloth laminated sheet. Alternatively, the radome 250 can also be made by other plastic sheet materials.

For sake of clarity, other components in FIG. 3 are not discussed in detail, since they are the same as those in FIG. 2.

Figure 4:
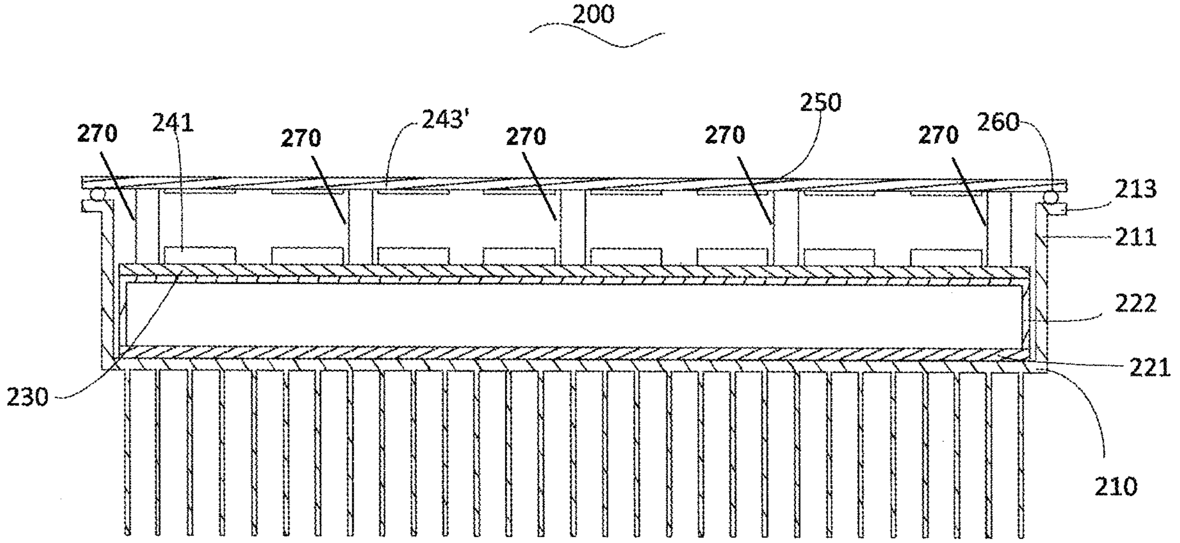
FIG. 4 is a schematic cross-sectional view of a variant of base station in accordance with a third embodiment of the present invention.

Please see FIG. 4, which shows a variant of the base station 200 as shown in FIG. 3. As compared to FIG. 3, the base station in FIG. 4 has the following two differences. One difference is to use a mounting boss 270 to support the radome 250. A plurality of the mounting bosses 270 are provided on the antenna board 230 and each of them extends from the antenna board 230 to the radome 250. It should be understood that the mounting boss 270 must be positioned in a space where it would not affect the performance of the antenna elements. In other words, the mounting boss 270 is provided in some gaps between adjacent antenna elements.

The other difference is to provide a protrusion 213, which horizontally extends outwardly from the wall 211. The glue 260 is provided between the radome 250 and the protrusion 213. The protrusion 213 can extend around a whole peripheral of the wall 211 or a part thereof.

Figure 5:
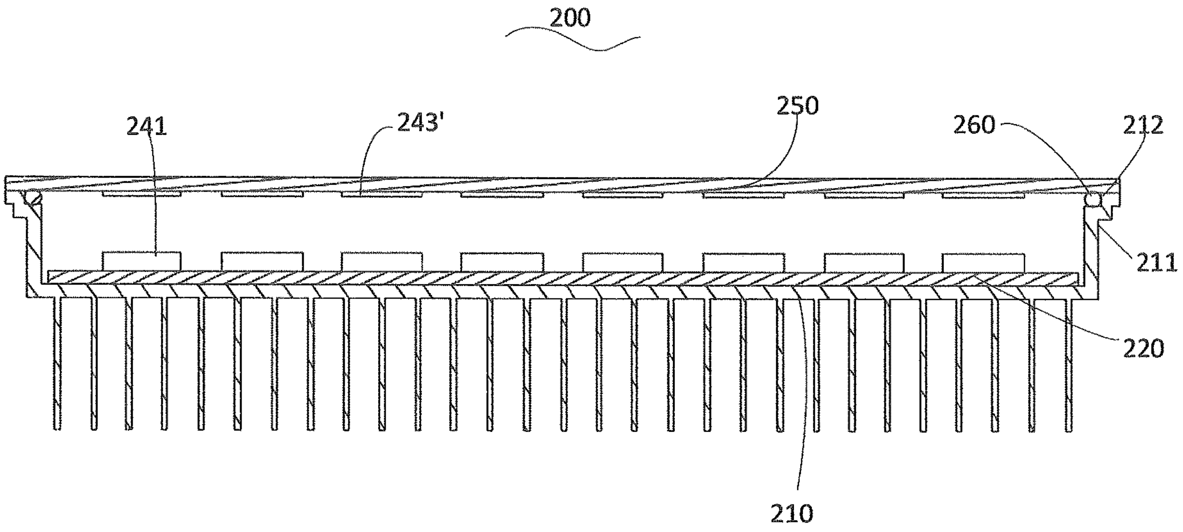
FIG. 5 is a schematic cross-sectional view of a further variant of a base station in accordance with a fourth embodiment of the present invention.

As shown in FIG. 5, it shows an arrangement of a base station 200 in accordance with another embodiment of the present invention. As compared with FIG. 3, it can be seen a main difference is to replace the first sub multifunction board 221, the second sub multi-function board 222 and the antenna board 230 by a single multi-function board 220. In this example, the single multi-function board 220 is a single board. In principle, the multi-function board 220 is integrated with at least two of functions of the radio board, the EMC cover, the AC board, the antenna reflector and the antenna board.

It is preferable for the multi-function board 220 to integrate all the functions of the radio board, the EMC cover, the AC board, the antenna reflector and the antenna board. Of course, the skilled person can only integrate some of the above functions into the multi-function board as long as the base station can properly function.

It should be understood that with the rapid development of 5G technology and semiconductor devices, it is feasible to make such integration. Herein, the implementing process of the integration is omitted, and the focus is put on the structure arrangement.

In the present embodiments, some examples are given out about placing the secondary radiators onto the radome; using the single multi-function board and placing the antenna elements on it; integrating the AC board into the radio board; manufacturing the radome by plastic plating or PCB etch technology; and using the glue to fix the radome to the heatsink for better assembly and tolerance covering, or the like. By these means, at least one of high integration, low cost and small size of the base station is achieved.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, all of which fall into the scope of the disclosure.

What is claimed is:

1. A base station for a communication network, the base station comprising:

a multi-function board, arranged to include functionality corresponding to at least two of the following: a radio board, an EMC cover, an antenna calibration (AC) board, an antenna reflector, and an antenna board;

a radome arranged to cover the multi-function board; and at least one antenna element, arranged between the multi-function board and the radome, wherein each of the at least one antenna element includes a primary radiator arranged on the multi-function board and a corresponding secondary radiator arranged according to one of the following: on a surface of the radome facing the multi-function board, or above the primary radiator.

2. The base station according to claim 1, wherein the multi-function board comprises a first sub multi-function board, a second sub multi-function board, and an antenna board in a stacked arrangement in which the second sub multi-function board is between the first sub multi-function board and the antenna board.

3. The base station according to claim 2, wherein the first sub multi-function board is arranged to include functionality of the radio board and the AC board.

4. The base station according to claim 2, wherein the second sub multi-function board is arranged to include functionality of the EMC cover and the antenna reflector.

5. The base station according to claim 4, wherein the second sub-multi-function board includes a mounting boss that extends between the second sub multi-function board and the radome.

6. The base station according to claim 2, wherein the at least one antenna element is arranged on the antenna board.

7. The base station according to claim 1, wherein each primary radiator and corresponding secondary radiator is arranged with a gap therebetween.

8. The base station according to claim 1, wherein each secondary radiator is etched or plated onto the surface of the radome.

9. The base station according to claim 1, wherein each primary radiator and each secondary radiator have the following characteristics:

round, square, triangle or pentagon shape; and made from metal or a printed conducting ink.

10. The base station according to claim 1, wherein each of the at least one antenna element includes a support member disposed between, and in contact with, the primary radiator and the corresponding secondary radiator.

11. The base station according to claim 1, wherein the at least one antenna element comprises a plurality of antenna elements arranged in an array.

12. The base station according to claim 1, further comprising a heatsink configured to support the multi-function board, wherein the heatsink is fixed to the radome by a buckle joint, an adhesive agent, or a screw.

13. The base station according to claim 12, wherein the heatsink includes a recess or protrusion with the adhesive agent located therein or thereon, whereby the heatsink is fixed to the radome.

14. The base station according to claim 1, wherein the radome is a flat plate.

15. The base station according to claim 1, wherein the radome is made from polycarbonate or a lamination sheet.

* * * * *